UNITED STATES PATENT OFFICE.

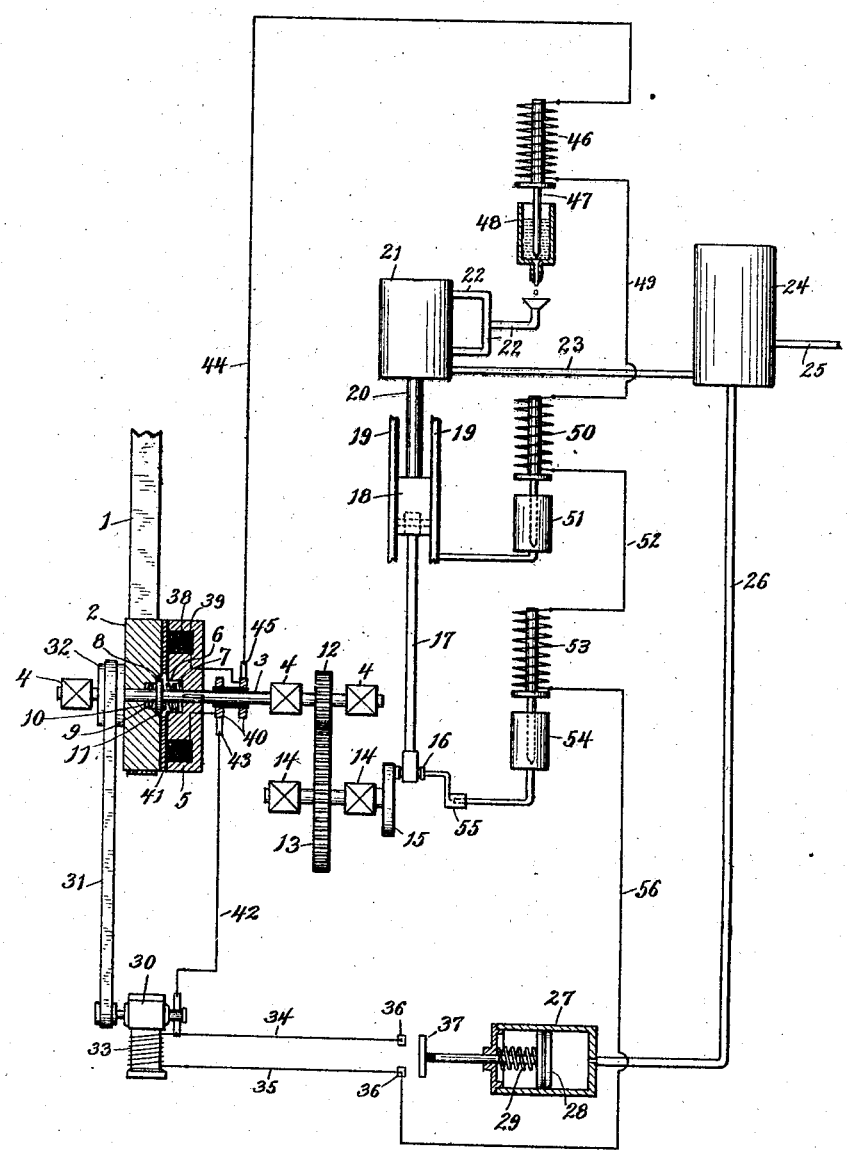

WALTER JOSEPH RICHARDS, OF MILWAUKEE, WISCONSIN.

SYSTEM OF FLUID-PRESSURE CONTROL.

No. 821,673.   Specification of Letters Patent.   Patented May 29, 1906.

Application filed March 21, 1904. Serial No. 199,240.

*To all whom it may concern:*

Be it known that I, WALTER JOSEPH RICHARDS, residing in Milwaukee, in the county of Milwaukee and State of Wisconsin, have invented new and useful Improvements in Systems of Fluid-Pressure Control, of which the following is a description, reference being had to the accompanying drawings, which are a part of this specification.

This invention relates to certain new and useful improvements in systems of fluid-pressure control, and has for its object to provide certain novel means for maintaining a given range of pressure in fluid-pressure systems by automatically connecting and disconnecting the compressor with a continuously-operating driving means, such automatic control of the compressor being actuated by the pressure in the fluid-pressure system.

A further object of this invention is to employ an electrical system for accomplishing both of the above objects and comprising, briefly, a generator driven by a constantly-operating source of power and supplying current for operating a magnetic clutch which controls the operation of the compressor from said continuously-operating source of power, the flow of such current from the generator being controlled by a switch sensitive to the variations of fluid-pressure in the system supplied with pressure by said compressor.

With the above and other objects in view the invention consists in devices and parts or their equivalents, as hereinafter fully set forth.

In the accompanying drawing the figure represents a diagram of a system of fluid-pressure control embodying this invention, parts being shown in section.

In the drawing, 1 represents a driving-belt from any suitable continuously-operating source of power (not shown) and driving a loose pulley 2, which is freely mounted upon a driving-shaft 3, which is journaled in suitable bearings 4, the loose pulley 2 being capable of movement on the shaft 3 longitudinally of the shaft as well as being free to rotate independently on said shaft.

A clutch-pulley 5 is rigidly keyed on the shaft 3 adjacent to the loose pulley 2 and has a recess 6 at the center of its face which is next to the loose pulley 2, and in this recess is seated a coil compression-spring 7, which bears at one end against the end of the recess and at the other end against a collar 8, which is loosely mounted on the shaft 3 between the clutch 5 and loose pulley 2. The collar 8 is limited in its movement on the shaft 3 by engagement with a pin 9, which extends through said shaft 3 and projects on either side thereof, and the loose pulley 2 is provided with a shouldered recess 10 to receive said pin 9, the annular shoulder 11 thereof being adapted to engage with the collar 8, so that when the loose pulley 2 is drawn into close engagement with the clutch 5 by means to be later described the collar 8 is pressed by said shoulder away from the pin 9, and said pin passes into the innermost portion of the recess 10, thus compressing the spring 7. When the means for drawing the loose pulley 2 toward the clutch against the action of spring 7 is released, the spring 7 under compression forces the collar 8 away from the clutch 5, and the collar being in engagement with the shoulder 11 of the recess 10 forces the pulley 2 to move on the shaft 3 away from the clutch, and thereby disconnects the shaft 3 from the driving means, and the shaft, with its driven parts, comes to rest.

A pinion 12 is carried by the shaft 3 between two of the bearings 4 and meshes with a gear-wheel 13, which is suitably journaled in bearings 14 and drives a crank-disk 15, whose wrist-pin 16 is connected by a pitman 17 with a cross-head 18, which is slidable in suitable guideways 19 and has connected thereto the piston-rod 20 of an air-pump cylinder 21.

The air-pump is of usual construction, taking in air at both ends through a branched intake-pipe 22 and discharging it through pipe 23 into a reservoir 24, which communicates by a pipe 25 with the means to be operated by compressed air, and also by a pipe 26 with a closed cylinder 27, in which is contained a piston 28, with a compression-spring 29 about its stem opposing the pressure of the air behind the piston.

A generator 30 is driven by a belt 31 from a supplemental pulley 32, rigidly connected to the pulley 2, so as to be constantly operated thereby, said generator being preferably series wound and having its field 33 connected by wires 34 and 35 with contact-points 36, adapted to be bridged over by a switch 37, connected to but insulated from the stem of piston 28, so that when the fluid-pressure behind the piston 28 is sufficient to overcome the resisting force of the spring 29 the switch 37 is caused to connect the contacts 36, and thereby short-circuit the field of the generator, and consequently check the flow of current generated thereby.

The clutch 5 is formed of iron or other magnetic material and has near its periphery a deep annular groove 38 formed in its face, and in this groove is wound a coil of insulated wire 39, with its terminals connected with collector-rings 40, mounted on but insulated from the shaft 3. When current is passed through the coil 37, the portion of the metal of clutch 5 within it becomes the core of an electromagnet which attracts the loose pulley 2 as its armature, the magnetic circuit being completed around the metal of the clutch which surrounds the coil. In order that the loose pulley 2 may not be held in contact with the clutch 5 by residual magnetism after the current through the coil ceases, the loose pulley 2 has connected to its inner face a flat disk 41, of brass or other non-magnetic material, which keeps the pulley 2 from coming into actual contact with the clutch.

A wire 42 connects the armature of the generator to a brush 43, bearing on one of the collector-rings 40, and a wire 44 connects with a brush 45, bearing on the other collector-ring 40 and leads to an electromagnet 46, whose armature is a pin-valve 47, which when raised by the magnet permits oil to flow from the oil-cup 48 to the funnel-shaped mouth of the intake-pipe 22 of the air-pump and when released by said magnet is adapted to fall to a position where it closes the passage leading from said oil-cup. A wire 49 connects the magnet 46 with a similar magnet 50 of an oil-cup 51, similar in all respects to the oil-cup above described and feeding oil to the guideways of the pitman 17, and a wire 52 connects the magnet 50 with a magnet 53 of a similar oil-cup 54, feeding oil to a bent tubular neck 55, carried by the wrist-pin 16, so as to convey oil thereto during the movements of said wrist-pin. A wire 56 connects the magnet 53 to that contact 36 which connects with the field-winding of the generator not in connection with the armature of said generator.

From the foregoing it will be seen that at all times the loose pulley 2 is being driven by the belt 1 and is driving the armature of the generator by means of belt 31, but that as long as the pressure in the reservoir 24, and therefore in the entire fluid-pressure system, is normal the piston 28 is held against the action of the coil-spring 29, so that the switch 37 short-circuits the field-winding of the generator, and therefore the generator does not provide current for operating the clutch, and consequently the compressor is out of operation and the magnetic oil-cups are closed against the passage of oil, due to the inactivity of their magnets. When, however, the pressure in the reservoir 24 becomes less than normal, the spring 29 overcomes the pressure behind the piston 28 and forces said piston to move the switch 37 out of engagement with the contacts 36, and thereby remove the short-circuit of the field-winding of the generator. This causes the generator to supply a flow of current through the controlling-circuit, energizing the clutch 5 to draw the loose pulley 2 into frictional engagement therewith, and thereby drive the shaft 3 and the motor-compressor in gear with it and at the same time cause the magnets 46, 50, and 53 to lift the valves of the oil-cups and permit the oil to flow to the several working parts above mentioned. Thus the compressor is set in operation to restore the pressure to the fluid-pressure system, and when the normal pressure is again attained the piston 28 is forced against its spring 29 to close the short-circuiting switch 37 and render inoperative the several parts, as before described, until the pressure in the fluid-pressure system is again reduced to less than normal. By this means the fluid-pressure system is kept at a comparatively constant pressure and oil is not fed to the working parts except during the operation thereof, and consequently no flooding with oil becomes possible.

While I have shown and described the switch 37 as for the purpose of short-circuiting the field of the generator 30, it is clear that such switch may perform its desired functions equally well when other connections are made to enable it to control the operation of the clutch, and therefore it is to be understood that this switch is not to be limited to the particular operation given to it, but that all modifications in its operation and construction by which the same results may be accomplished are to be considered as included in this invention.

While for convenience the magnets of the clutch and the oil-cups are referred to herein as being included in an electrical circuit, it is not to be understood therefrom that a single series circuit only is meant; but as the several magnets may be connected otherwise and still be controlled by the switch in the manner described the invention is not confined to any particular method of connecting these parts.

What I claim as my invention is—

1. A system for fluid-pressure control, comprising a driving mechanism, a pump, an electrically-controlled means for connecting the pump with the driving mechanism, an electric generator driven by the driving mechanism and supplying current to the said electrically-controlled means, and a switch sensitive to the fluid-pressure for controlling the flow of current to said electrically-controlled means.

2. A system for fluid-pressure control, comprising a driving mechanism, a pump, an electrically-controlled means for connecting the pump with the driving mechanism, a series-wound electric generator driven by the driving mechanism and supplying current to the electrically-controlled means, and a switch sensitive to the fluid-pressure for short-circuiting the field-winding of said generator.

3. A system for fluid-pressure control, comprising a driving mechanism, a pump, an electrically-controlled clutch for connecting the pump with the driving mechanism, an electric generator driven by the driving mechanism and supplying current to the electrically-controlled clutch, and a switch sensitive to the fluid-pressure for controlling the flow of current to said electrically-controlled clutch.

4. A system for fluid-pressure control, comprising a driving mechanism, a pump, an electrically-controlled clutch for connecting the pump with the driving mechanism, a series-wound electric generator driven by the driving mechanism and supplying current to the said electrically-controlled clutch, and a switch sensitive to the fluid-pressure for short-circuiting the field-winding of said generator.

5. A system for fluid-pressure control comprising a driving mechanism, a pump, a magnetically-operated clutch for connecting the pump with the driving mechanism, an electric generator driven by the driving mechanism and supplying current to the clutch-operating magnet, and a switch sensitive to the fluid-pressure for controlling the flow of current to said magnet.

6. A system for fluid-pressure control, comprising a driving mechanism, a pump, a magnetically-operated clutch for connecting the pump with the driving mechanism, a series-wound electric generator driven by the driving mechanism and supplying current to the clutch-operating magnet, and a switch sensitive to the fluid-pressure for short-circuiting the field of said generator.

In testimony whereof I affix my signature in presence of two witnesses.

WALTER JOSEPH RICHARDS.

Witnesses:
R. S. C. CALDWELL,
ANNA F. SCHMIDTBAUER.